April 26, 1927.
F. R. SCHMITT
METHOD OF SHELLING COCONUTS
Filed June 5, 1926   2 Sheets-Sheet 1
1,626,361
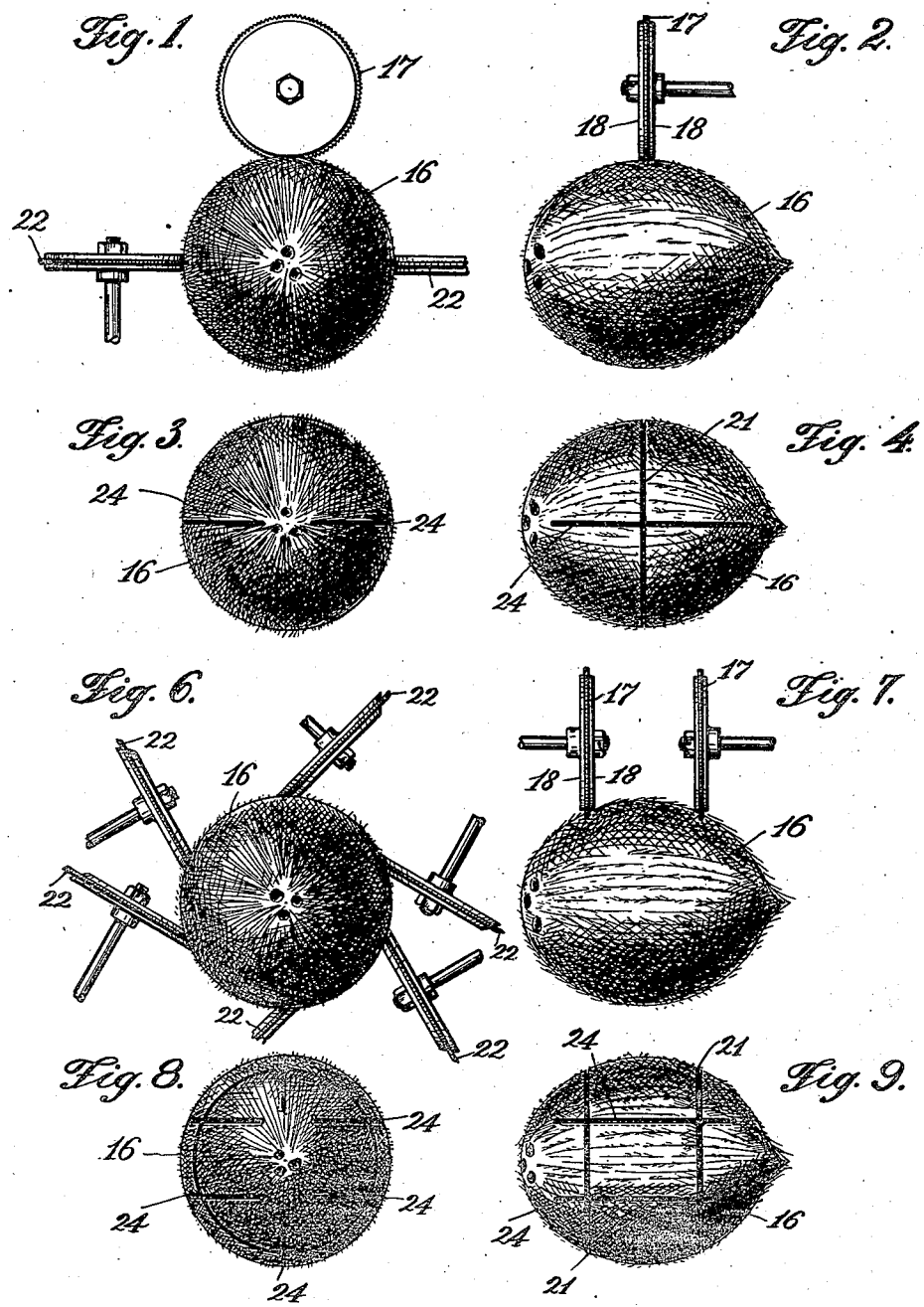

April 26, 1927.
F. R. SCHMITT
METHOD OF SHELLING COCONUTS
Filed June 5, 1926    2 Sheets-Sheet 2
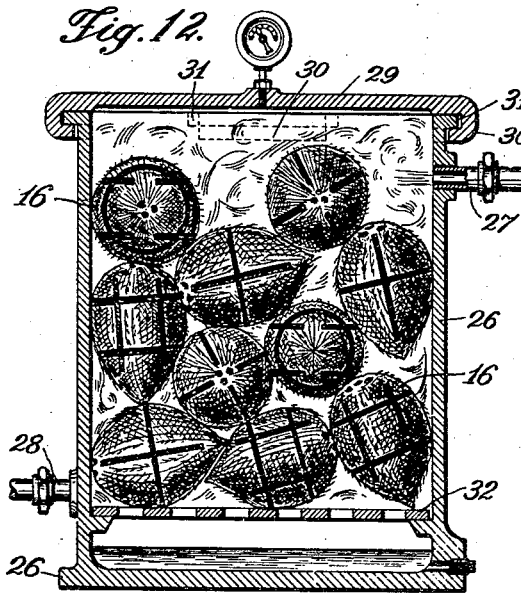
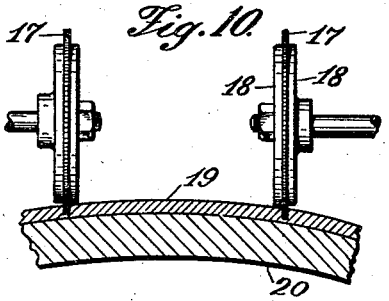
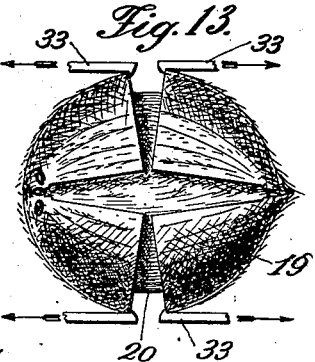
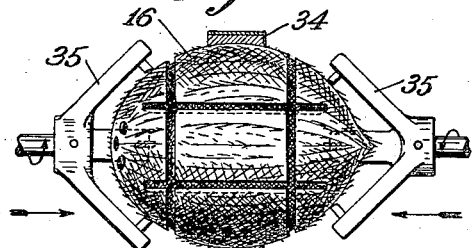
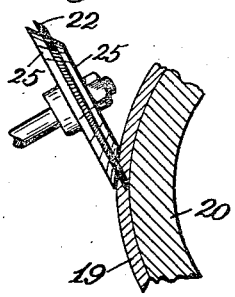
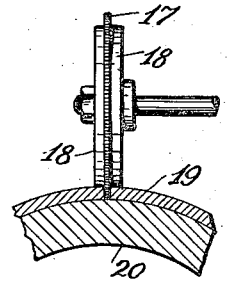
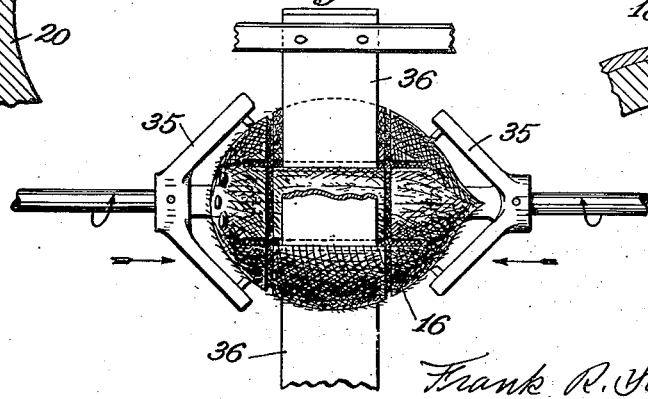
INVENTOR
Frank R. Schmitt
BY
Sydney H. Prescott
ATTORNEY Patented Apr. 26, 1927.

1,626,361

UNITED STATES PATENT OFFICE.

FRANK R. SCHMITT, OF BROOKLYN, NEW YORK, ASSIGNOR TO AMERICAN MACHINE AND FOUNDRY COMPANY, A CORPORATION OF NEW JERSEY.

METHOD OF SHELLING COCONUTS.

Application filed June 5, 1926. Serial No. 113,850.

This invention relates to a method of shelling coconuts; that is, of removing the hard shells from the nuts without injuring the latter. The method consists in steaming the shell to loosen it from the nut, and then removing said shell by breaking it at predetermined places. Usually, the shell is first weakened at places, then steamed, and then broken from the nut at the weakened places. Usually also, steam under pressure is used to more quickly loosen the shell from the nut.

In the accompanying drawings, various ways of weakening the shells are shown, some being used for coconuts grown in one part of the world, and others for coconuts grown elsewhere, for coconuts grown in different parts of the world have different characteristics and cannot all be handled in the same way. In Figs. 1 and 2, end and side elevations of a coconut are shown in position for weakening or grooving, one continuous and two transverse grooves to be cut in this instance. Figs. 3 and 4 are end and side elevations of the coconut after being grooved by the saws shown in Figs. 1 and 2. Fig. 5 is an enlarged cross-section of the cuts made by the tools shown in Figs. 1 and 2. Figs. 6 and 7 are end and side elevations of a coconut showing the saws in position for two continuous cuts and six transverse cuts. Figs. 8 and 9 are end and side views of the coconut after being grooved by the tools shown in Figs. 6 and 7. Fig. 10 is an enlarged cross-section of the crosswise cuts made by the saws shown in Fig. 7. Fig. 11 is an enlarged cross-section of the transverse cuts made by the inclined saws shown in Fig. 6. Fig. 12 is a sectional elevation of the steam-chamber in which the shells are loosened from the nuts, showing the grooved shells exposed to the live steam. Fig. 13 is a side view showing the manner of prying apart the shell sections along its weakened parts when the shell has one crosswise and two lengthwise cuts, as in Figs. 3 and 4. Fig. 14 is a side view showing the manner of removing the shell end sections of a coconut with two crosswise cuts, as in Figs. 8 and 9. And Fig. 15 is a side view showing the manner of prying apart the shell middle sections of the coconut shown in Fig. 14.

Referring to Figs. 1, 2, 6 and 7: For the first or weakening operation, the coconut 16 is first revolved around its longitudinal axis while being held against one or more saws 17 placed perpendicular to that axis. The saws 17 are provided with guard plates 18 to prevent them from cutting entirely through the shell. The inner part of the shell 19 is thus left intact in order to protect the nut inside, marked 20 (see cross-sections, Figs. 5 and 10). After having made a complete revolution around its longitudinal axis, thereby producing the continuous groove 21, the coconut is next held against one or more saws 22, either parallel or inclined to the longitudinal axis, and is turned on an axis perpendicular to the longitudinal axis, Fig. 1 showing one pair of diagonally placed parallel saws 22 for cutting a single lengthwise groove into each side of the shell, and Fig. 6 three pairs of inclined saws 22 for making three parallel lengthwise grooves 24 into each side of the shell. The lengthwise cuts 24 are not carried around the entire circumference of the coconut, but stop some distance from its points, their object being to cause the spreading of the middle section of the shell so as to facilitate its removal from the ends.

The lengthwise cutting saws, like the crosswise cutting saws, have guard plates 25 which prevent the saws from cutting too deeply. In Fig. 11, the cross-section of a cut made by one of the inclined saws 22 is shown. The slotted coconut after the first operation has the appearance shown in Figs. 3, 4, 8 and 9, according to the number of cuts employed.

It may be here remarked that in carrying the method into effect, the device for holding and slotting the coconut may either be arranged so as to hold the saws in stationary position and turn the coconut, or to hold the coconut in stationary position while the saws move around it. For the lengthwise cuts, one saw may be used and either the saw or the coconut successively set at the different angles to make the various cuts, or two or more saws may be employed simultaneously to cut down the time of operation.

After being grooved or otherwise weakened, the coconuts, for the second operation, are placed in a steam chamber 26 having a steam inlet 27, steam outlet 28, and the cover 29 which is preferably arranged with projecting hooks 30 engaging flange lugs 31 of the chamber, so that the latter can be quickly opened and closed by turning the cover through a small angle. Within the chamber is a perforated plate 32 on which the coconuts, or a part of them, rest while being steamed, the plate 32 preventing condensation water from remaining in contact with the coconuts during the steaming operation and thus to counteract the expanding effect of the superheated live steam. The steam, under approximately 60 lbs. pressure, when the coconuts are kept dry, expands the slots cut in the shells and thereby, partly at least, loosens the latter, the degree of this action depending upon the kind of coconut treated, as those grown in different parts of the world differ considerably as to the texture and adhesiveness of their shells. The steam also loosens the shells from the nuts within.

The steamed coconuts are now subjected to the third operation or step in the method; that is, to the actual shelling. If the coconut is of a size and variety to necessitate only one crosswise and one pair of lengthwise cuts, as in Figs. 3 and 4, the prying operation simply consists in inserting a flat tool, such as a broad screw driver, into the grooves and twisting the tool, repeating the operation as often as necessary. Or, the loosened parts of the shell may be removed by means of hooks 33 inserted in the expanded slots and pulled apart, as shown in Fig. 13.

In case of two continuous crosswise cuts, as in Figs. 8 and 9, the shelling operation consists in first holding the middle of the coconut by means of clamps 34, Fig. 14, and twisting the end portions of the shell in opposite directions by means of grippers 35 pressed against the ends of the coconut. To remove the middle sections of the shell, the loosened end portions are put back on the coconut and the latter clamped between the grippers 35 as shown in Fig. 15. Stationary holding plates 36, set at an angle corresponding with that of the saws 22 in Fig. 6 are then inserted in the inclined axial slots, and the two grippers 35 are turned as one, so as to force the middle sections of the shell towards the holders 36. Or, the grippers 35, after being pressed against the ends of the reconstricted coconut, may be held stationary and the plates 36 which are then mounted upon a revoluble frame or cage, turned in the direction opposite to that shown by the arrows on the gripper shafts in Fig. 15.

The shells are thus removed from the nuts without injuring the latter in the least, and far more rapidly than is possible by the hand methods heretofore employed.

What is claimed is:

1. The method of shelling a coconut, which consists in weakening a part of its shell to control subsequent breakage, then steaming said shell to loosen it from the nut, and then removing said shell by breaking it at its weakened part.

2. The method of shelling a coconut, which consists in linearly weakening its shell to control subsequent breakage, then steaming said shell to loosen it from the nut, and then removing said shell by breaking it at its weakened part.

3. The method of shelling a coconut, which consists in circumferentially weakening its shell to control subsequent breakage, then steaming said shell to loosen it from the nut, and then removing said shell by breaking it at its weakened part.

4. The method of shelling a coconut, which consists in linearly weakening its shell in a plurality of directions to control subsequent breakage, then steaming said shell to loosen it from the nut, and then removing said shell by breaking it at its weakened part.

5. The method of shelling a coconut, which consists in linearly cutting its shell nearly through to weaken it and control subsequent breakage, then steaming said shell to loosen it from the nut, and then removing said shell by breaking it at its weakened part.

6. The method of shelling a coconut, which consists in weakening a part of its shell to control subsequent breakage, then subjecting said shell to the action of steam under pressure to loosen it from the nut, and then removing said shell by breaking it at its weakened part.

7. The method of shelling a coconut, which consists in linearly cutting its shell nearly through to weaken it and control subsequent breakage, then subjecting said shell to the action of steam under approximately 60 lbs. pressure to quickly loosen it from the nut, and then removing said shell by breaking it at its weakened part.

In testimony whereof, I have signed my name to this specification.

FRANK R. SCHMITT.